July 14, 1959    R. C. HOFF ET AL    2,895,064
VIBRATORY MOTOR

Filed Dec. 5, 1955    2 Sheets-Sheet 2

INVENTORS
RONALD C. HOFF
LESTER R. MOSKOWITZ
BY
Charles L. Lovercheck
attorney

United States Patent Office 2,895,064
Patented July 14, 1959

2,895,064

VIBRATORY MOTOR

Ronald C. Hoff and Lester R. Moskowitz, Erie, Pa., assignors to Eriez Manufacturing Company, Erie, Pa., a corporation of Pennsylvania Application December 5, 1955, Serial No. 551,036

3 Claims. (Cl. 310—29)

This invention relates to motors and more particularly to vibratory motors for imparting a vibration to a bin, screen, or the like.

The motor itself in the preferred form consists of an armature comprising a permanent magnet which may have iron pole pieces. Supporting this armature structure are springs which are fastened to the motor. The electromagnet core which is of E construction is preferably also attached to the motor but, conversely, the E-shaped core could be of fixed polarity and spring mounted with the armature fixed or any combination of fixed or movable electromagnet and fixed or movable polarity of core and armature. The armature is so located that the pole pieces are intermeshed with the outer legs of an E type electromagnet. The armature may be made of heavy material so that it will have considerable inertia and the weight of it moving in space will produce vibration in the medium to which it is attached. The electromagnet is energized directly from an alternating current source which causes the polarity of the electromagnetic poles to change from North to South with the change of polarity of the current.

The polarity of the permanent magnet which, of course, could be an electromagnet energized by a direct current, is fixed and does not change. When electrical power of typical sine wave form is applied to the coil, the polarity of the electromagnet will vary with the polarity of the power supply and, therefore, when the electrical power supplied is in one phase, all the poles will be aiding each other to urge the armature in one direction. When the polarity of the power supply reverses, all the poles will aid each other to urge the armature in the other direction. A force can be applied on a noiseless unit utilizing the inertia of the armature or the armature may be designed to impact on a solid or semi-elastic material to produce an impact or a semi-noiseless unit.

It is, accordingly, an object of this invention to provide a vibratory motor which is simple in construction, economical to manufacture, and simple and efficient to use.

A further object of the invention is to provide a vibratory motor which has high efficiency, is of smaller size than prior motors, and no special power supply is required since it uses simple alternating current.

Another object of this invention is to provide a vibratory motor having an armature coupled to the base in such manner as to deliver the inertial forces developed by the unit to a bin wall in a sinusoidal manner.

Another object of the invention is to provide a vibratory motor utilizing a unique magnetic circuit for imparting vibration to a machine to which the motor is attached.

Another object of the invention is to provide a magnetic circuit in a vibratory motor which will not tend to demagnetize any part thereof.

It is a further object of this invention to provide a vibratory motor in combination with a hopper wherein force is applied to the hopper in a unique manner.

A still further object of this invention is to provide a magnetic circuit in a vibratory motor wherein the permanent magnet is subjected to a magnetizing force by the electromagnet.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 3 is a schematic view of a bin with the motor attached thereto.

Figure 1:
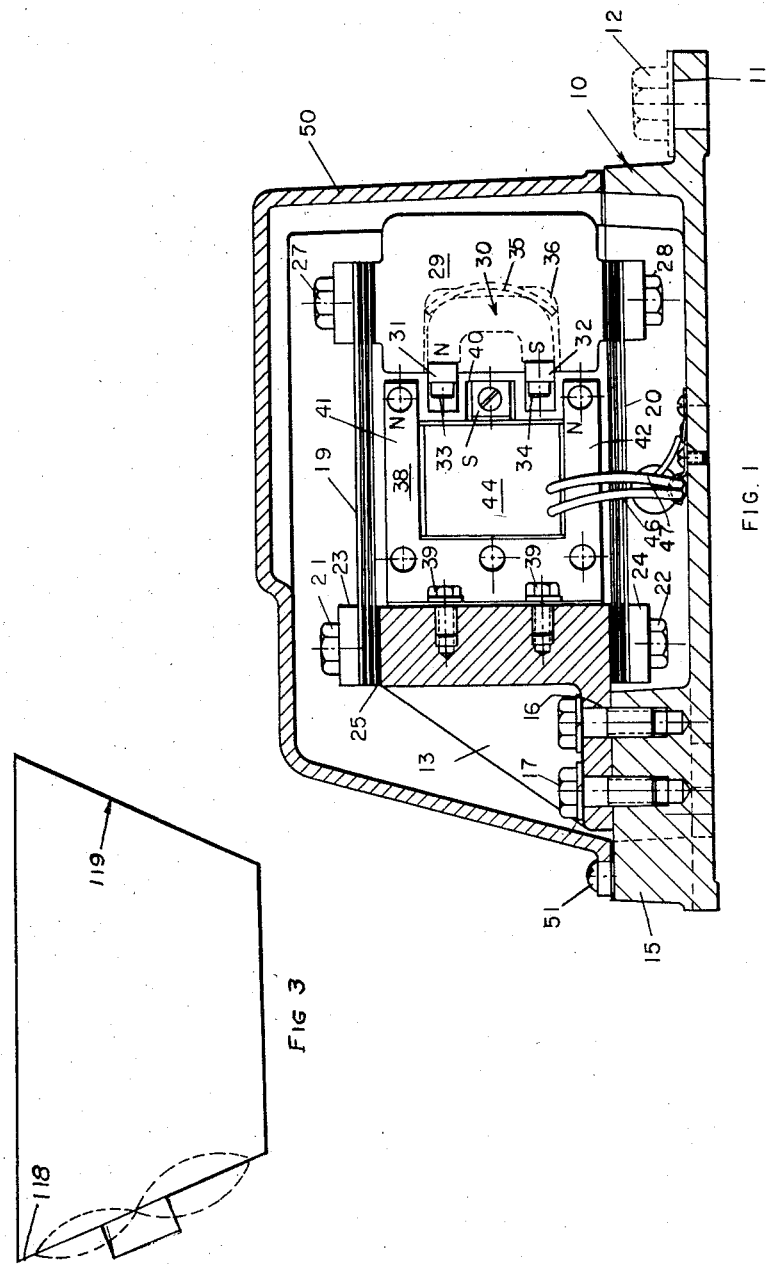
Fig. 1 is a longitudinal cross sectional view of a vibratory motor according to the invention.

Now with more specific reference to the drawings, the motor shown in Fig. 1 has a base 10 having mounting holes 11 which are adapted to receive bolts 12 for attaching the motor to a bin, hopper, screen, feeder, conveyor, or other device to be operated by vibratory means. The base 10 has an enlarged end portion 15 which supports a bracket 13. The bracket 13 has holes 16 therethrough which receive bolts 17.

Attached to the bracket 13 are springs 19 and 20 which are preferably leaf springs made up of separate leaves held in spaced relation by flat metal spacers 25. The springs 19 and 20 have holes in each end thereof and the holes in the end adjacent the bracket 13 receive bolts 21 and 22 which clamp bars 23 and 24, respectively, to the springs 19 and 20 with the spacers 25 therebetween. The distal ends of the springs 19 and 20 have holes which receive bolts 27 and 28, respectively. The bolts 27 and 28 extend through the holes in the ends of the springs 19 and 20 and into a permanent magnet armature support 29 which has a permanent magnet 30 supported thereon. Because of the manner in which the armature 29 is mounted at the end of the springs 19 and 20, when the armature 29 is vibrated, a twisting force will be imparted to the base 10 and thence transmitted to the body to which the base 10 may be attached. The twisting effect of the motor causes side 118 of bin 119 to be flexed in the form of a sine wave as in Fig. 3.

The permanent magnet 30 has pole pieces 31 and 32 attached thereto by means of bolts 33 and 34. A resilient spring 35 generally U-shaped abuts against the inside of a cavity 36 in the support 29 and holds the permanent magnet 30 in the cavity 36 in the armature 29. The support 29 may be made of a heavy piece of metal which, when in motion, has considerable inertia which it will impart to the machine to which the motor is attached.

A laminated iron core 38 is attached to the bracket 13 by means of bolts 39 and the core 38 has a central leg 40 and outer legs 41 and 42, respectively. A coil 44 is wound around the central leg 40 of the E-shaped core 38 and terminates in wires 46 and 47 which have suitable electrical terminals on the ends thereof which are suitable to be attached to a source of electrical power. A cover 50 is provided to protect the motor from foreign material and from mechanical damage. The cover 50 is held in place over the electrical and magnetic assembly by means of screws 51 which threadably engage the base 10 and hold the cover 50 in place thereon.

The permanent magnet 30 will be of fixed polarity, for example, as shown by N and S. It is understood that a core of the shape of the magnet 30 could be substituted therefor and wound with a coil to be excited by direct electrical current. When one-half cycle of the electrical current is applied to the coil 44, the outer legs 41 and 42 of the E core 38 will be magnetized N and the inner leg 40 will be magnetized S. Therefore, the end pole of the permanent magnet 30 will repel the upper end leg 41 and attract the center leg 40, while the South pole of the permanent magnet 30 will repel the center leg 40 and attract the other end leg 42. All the poles will aid each other to urge the armature 29 upward. Then when the electrical current reverses polarity, the poles of the E core 38 will change and the armature 29 will be urged downward. The force of the inertia of the moving mass will be transmitted to the frame of the motor and thence to the machine to which the motor is attached.

Figure 2:
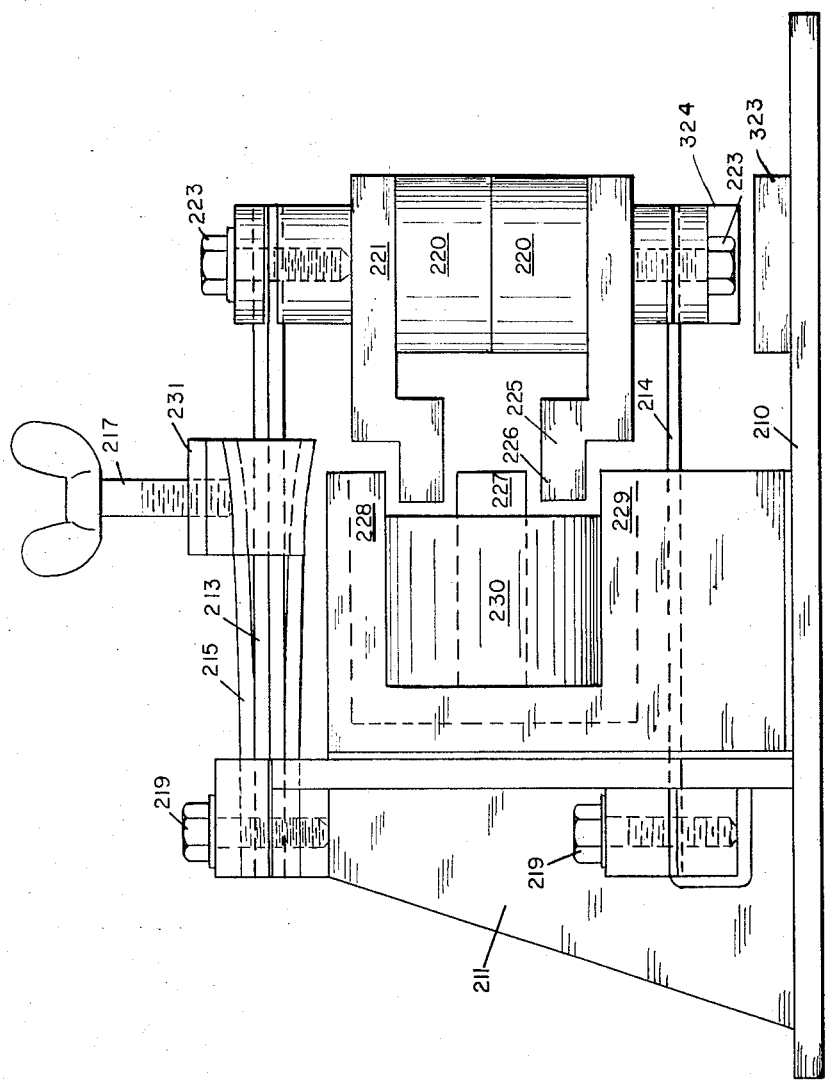
Fig. 2 is a view of another embodiment of the invention.

Fig. 2 discloses another embodiment of the invention showing a magnetic motor having a base plate 210 with a frame bracket 211 fixed thereto which supports upper main leaf springs 213 and lower main leaf springs 214. The upper springs 213 are adjustably reinforced by tuning springs 215, the tension of which can be adjusted by means of a thumb bolt 217 which is threadably received in a tuning spring yoke 231. All the springs 213 and 214 are clamped to the bracket 211 by bolts 219 which extend through holes in the springs 213 and 214.

Permanent magnets 220 have pole plates 221 clamped thereto by means of clamping bolts 223 or otherwise and the pole plates 21 extend inwardly at 225 and then toward the E-shaped magnet at 226. The E-shaped magnet has a central leg 227 and outer legs 228 and 229 as described for the magnet in the preceding embodiment with an electrical coil 230 wound thereon. A hammer 324 is attached to the armature and it impacts on inertial anvil 323 as the armature vibrates. The magnetic motor shown in this figure can be used in any application for which the other motor shown herein can be used.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows.

I claim:
1. A vibratory motor comprising a base, a bracket attached to said base, two spaced leaf springs attached to said bracket, a core attached to said bracket between said leaf springs, said core having three parallel spaced legs, one said leg being disposed between said other two legs, a coil on said intermediate leg, a permanent magnet attached to the distal ends of said leaf springs, said magnet having two spaced pole pieces attached to said permanent magnet one at each pole thereof, said pole pieces being disposed between said legs of said core in spaced relation thereto, a tuning spring attached to said bracket on one side of one said leaf spring and curving outwardly therefrom, and means to urge a greater length of said tuning spring into engagement with said one leaf spring whereby the natural frequency of vibration of said one leaf spring is changed.

2. A vibratory motor comprising a base, a magnetic core attached to said base, said core having an intermediate leg and an outer leg spaced on each of two opposite sides thereof, a coil around said core, a fixed polarity magnet having two poles, an armature having an opening therein, said fixed polarity magnet disposed in said opening in said armature, and a spring in said armature engaging said magnet and urging said magnet into engagement with said armature whereby said magnet is supported therein, one pole of said fixed polarity magnet being disposed between one said outer leg and said intermediate leg on said core.

3. The motor recited in claim 2 wherein said spring comprises a spaced leaf spring having spacing means therebetween.

References Cited in the file of this patent
UNITED STATES PATENTS

| 2,467,748 | Hittson | Apr. 19, 1949 |
| 2,539,391 | Alvord | Jan. 30, 1951 |
| 2,554,538 | Murphy | May 29, 1951 |

FOREIGN PATENTS

| 297,882 | Great Britain | Oct. 1, 1928 |
| 414,950 | Germany | June 11, 1925 |
| 867,459 | Germany | Feb. 19, 1953 |
| 1,080,986 | France | June 2, 1954 |